Figure 1:
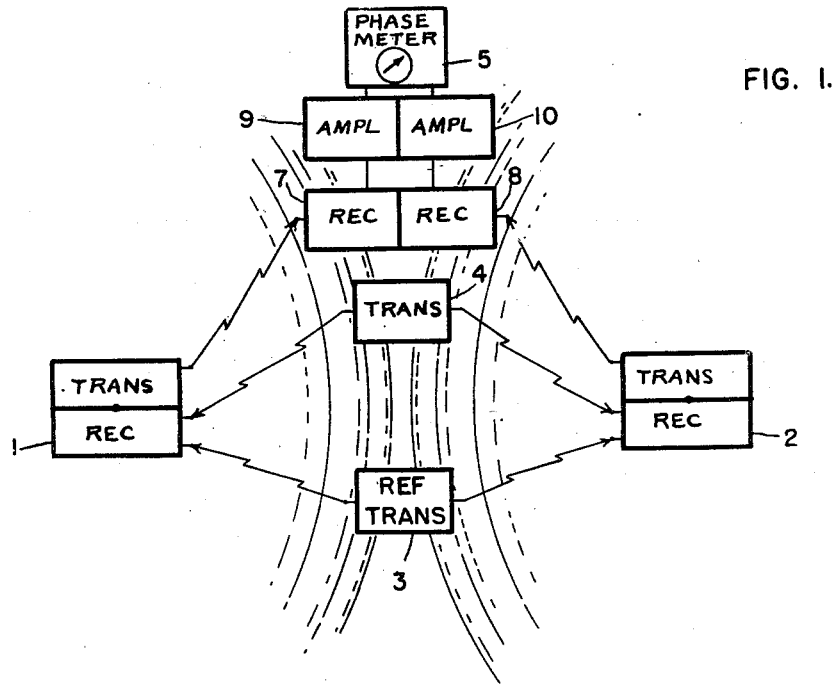

Oct. 31, 1950     C. E. HASTINGS     2,528,141
NAVIGATION AND TRACKING APPARATUS
Filed June 8, 1948     5 Sheets-Sheet 1

Inventor
CHARLES E. HASTINGS

Cushman, Darby & Cushman
Attorneys

Oct. 31, 1950  C. E. HASTINGS  2,528,141
NAVIGATION AND TRACKING APPARATUS
Filed June 8, 1948  5 Sheets-Sheet 3

Inventor
CHARLES E. HASTINGS

Cushman, Darby & Cushman
Attorneys

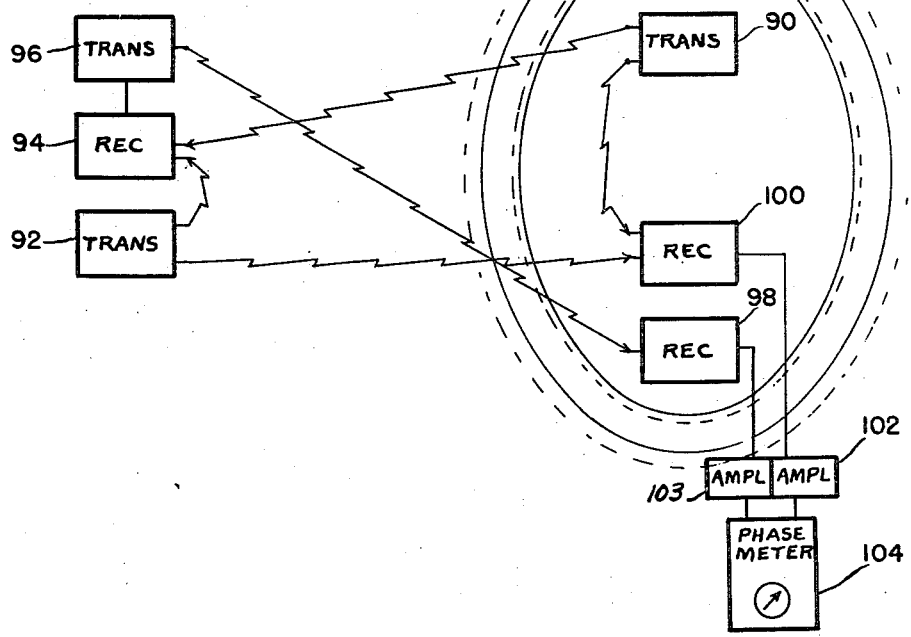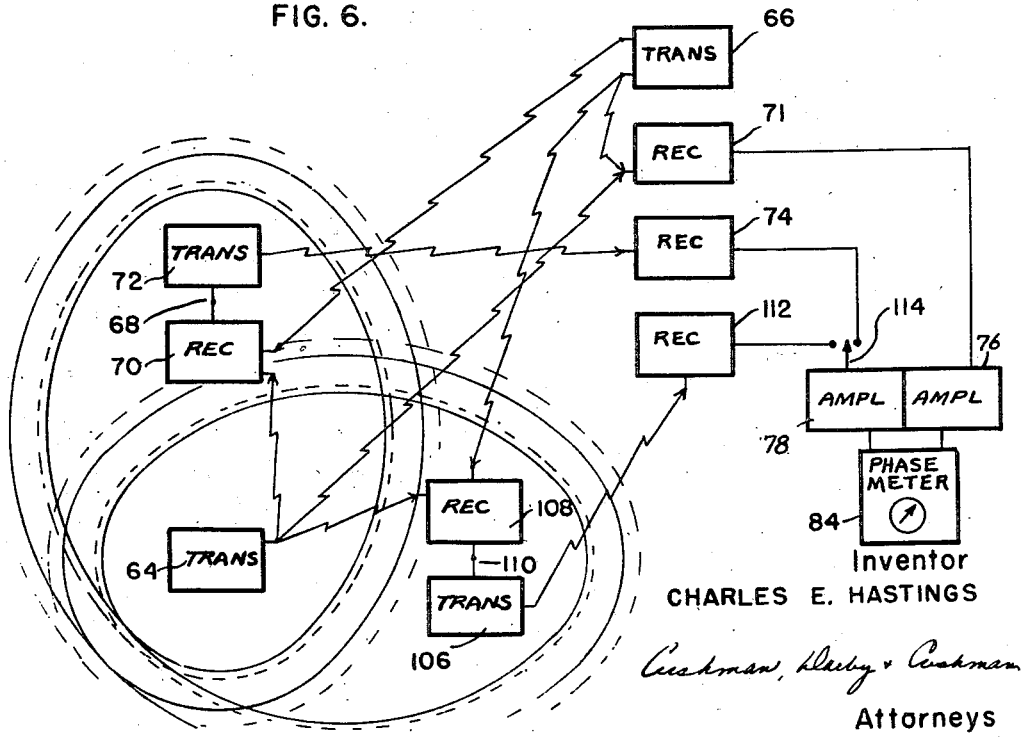

Oct. 31, 1950 C. E. HASTINGS 2,528,141
NAVIGATION AND TRACKING APPARATUS
Filed June 8, 1948 5 Sheets-Sheet 5

Inventor
CHARLES E. HASTINGS

Cushman, Darby & Cushman
Attorneys

Patented Oct. 31, 1950

2,528,141

UNITED STATES PATENT OFFICE 2,528,141

NAVIGATION AND TRACKING APPARATUS

Charles E. Hastings, Hampton, Va., assignor to Hastings Instrument Company, Inc., Hampton, Va., a corporation of Virginia Application June 8, 1948, Serial No. 31,682

28 Claims. (Cl. 343—105)

This invention relates to navigational equipment that is operated on the principle of phase comparison of the carrier frequency waves.

Although many different types of navigational equipment have been devised, none of them are able to indicate position within a matter of inches. Such accuracy becomes necessary in many operations such as exploring for oil, guiding missiles, and controlling gun fire. Furthermore, the elements of this system are comprised of standard radio transmitters and receivers which can be used for other purposes.

In phase operated navigational systems in which the distances to be determined are a fractional part of the wave lengths being used, it is not necessary to provide for what is known as lane identification. However, these systems are not as accurate as systems in which the wave length of the frequencies being used is less than the distances being determined for the reason that the amount of distance per degree of the phase meter reading is much greater. Therefore, this invention also provides a method of operating the navigational system that requires no additional equipment for the determination of position to the nearest wave length of the frequencies being used.

The principal object of this invention is to provide navigational equipment that can determine position within a few inches no matter what the distances involved might be.

Another object is to provide accurate navigational equipment using standard transmitters and receivers.

A still further object is to provide accurate navigational equipment such that variations in the transmitted frequencies produce errors of a second order of magnitude.

A still further object is to provide means for operating the navigational equipment in such manner that position can be determined within the nearest wave length of the carrier frequency being used.

Another object is to provide a navigational system in which the navigational data can be obtained at the mobile object, at any other desired location, or both.

A still further object is to provide an elliptical navigational system.

A still further object is to provide, in combination, an hyperbolic system and an elliptical system such that the intersections of the hyperbolas and ellipses indicate positions relative to fixed stations.

Figure 4:
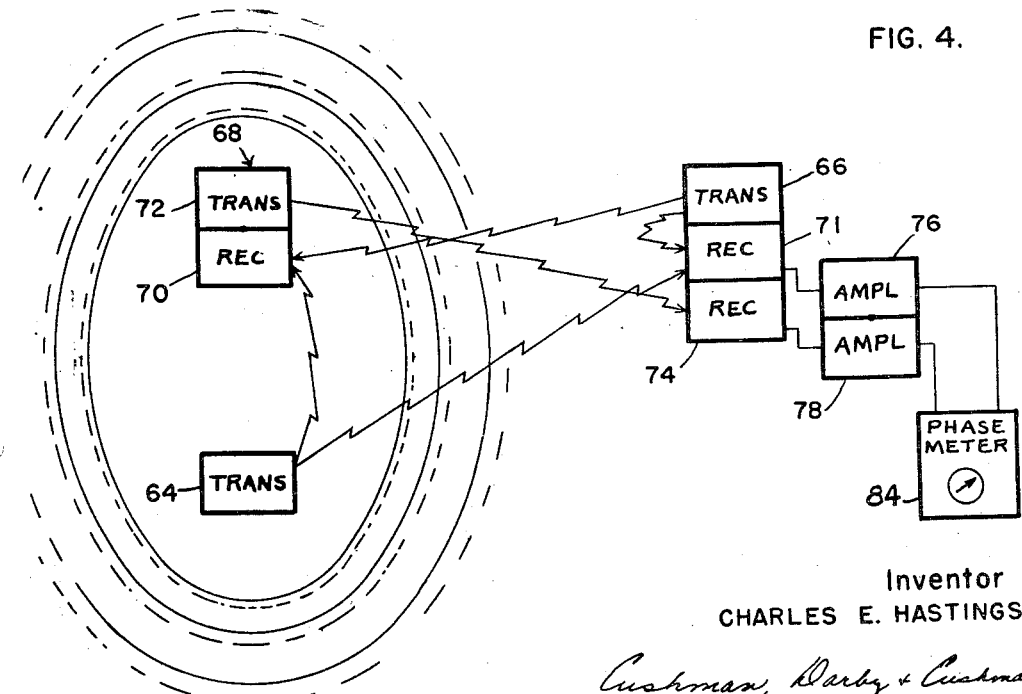
Figure 2:
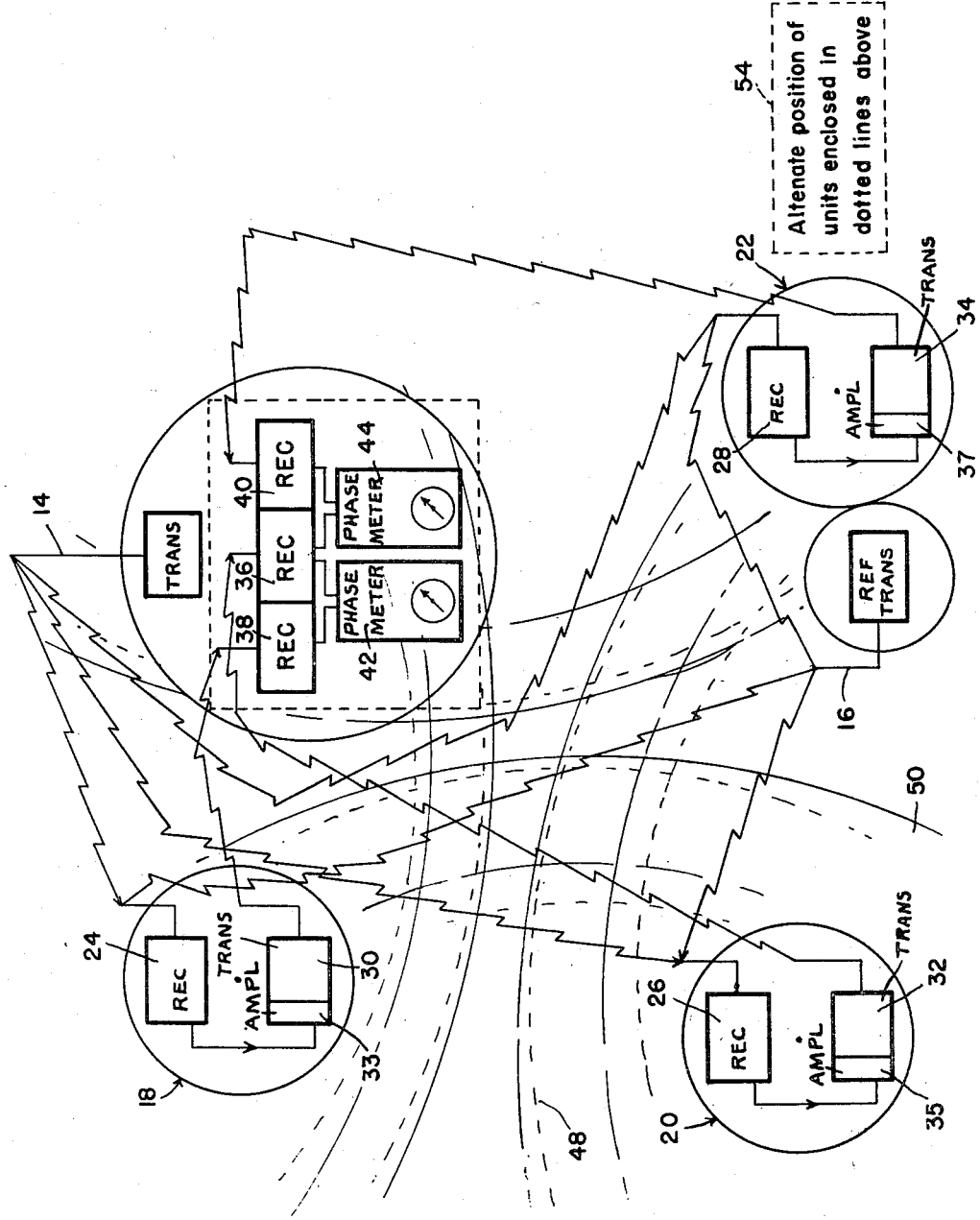
Figure 3:
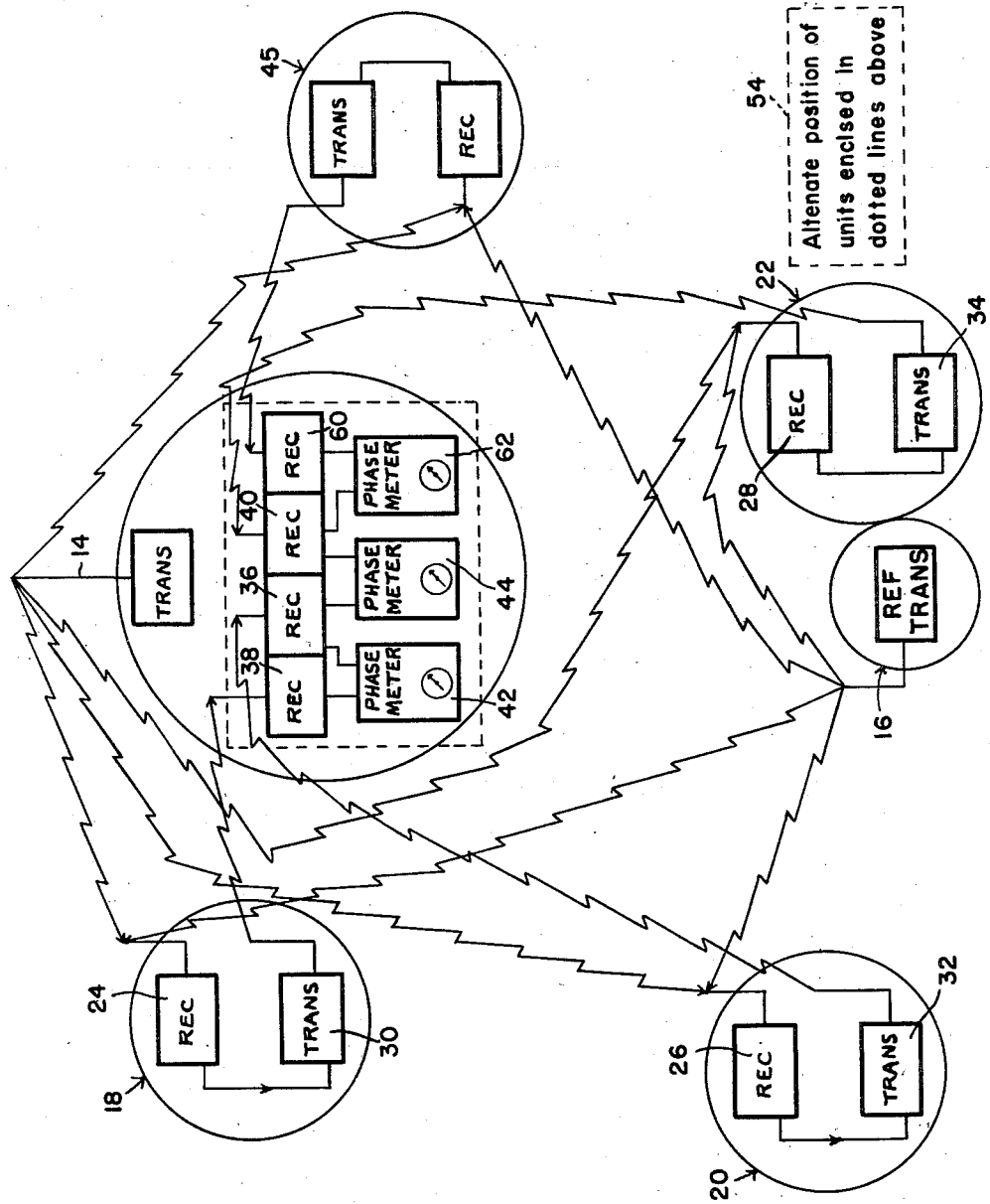
Figures 7, 8:
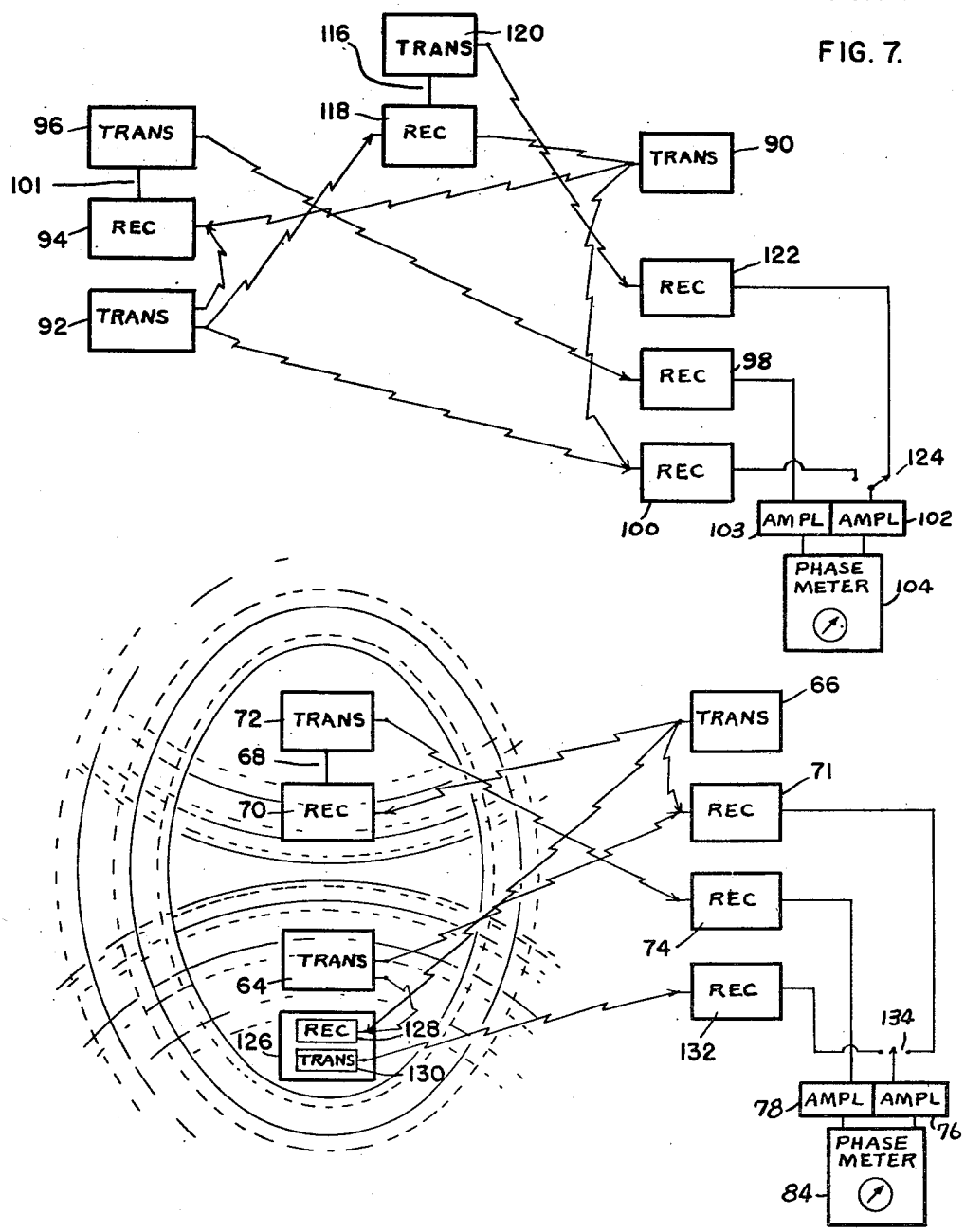

Referring to the drawings:

Figure 1 is a block diagram illustrating the basic elements of an hyperbolic system of navigation, Figure 2 is a block diagram illustrating a navigational system employing intersecting hyperbolas, Figure 3 is a block diagram illustrating a three dimensional hyperbolic navigation system, Figure 4 is a block diagram illustrating the essential components of an elliptical navigating system, Figure 5 is a block diagram illustrating the essential elements of an elliptical tracking system, Figure 6 is a block diagram illustrating an elliptical navigation system, Figure 7 is a block diagram illustrating a combination of elliptical and hyperbolic navigation systems, and Figure 8 is a block diagram illustrating an apparatus arranged so as to combine the elliptical and hyperbolic navigational systems.

Figure 1 illustrates the basic elements required for determining which hyperbolic line the object being navigated is on. It comprises a fixed relay station 1, a second fixed relay station 2, and a reference transmitter 3. A mobile transmitter 4, a phase meter 5, receivers 7 and 8, and constant output amplifiers 9 and 10 are mounted on the object being navigated. In operation, the transmitters 3 and 4 are tuned to different frequencies within the same channel, and the beats between these frequencies are received and detected at relay stations 1 and 2, respectively. Any suitable means which may include F. M. or A. M. radio links or cable connections are used to relay information indicative of the phase of the beat frequencies as they are received at the respective relay stations to receivers 7 and 8, respectively, mounted on the object being navigated or at a fixed position.

Although the frequency detected at each relay station is equal to the difference between the transmitted frequencies from transmitters 3 and 4, the phase of these detected beat frequencies is different for different positions of the navigated object. These beat frequencies are relayed back to separate receivers 7 and 8 on the navigated object and the outputs of these receivers are equalized by constant output amplifiers 9 and 10, respectively, the outputs of the amplifiers 9 being fed to the phase meter 5.

As long as the difference in the distance between a navigated object and the two relay stations 1 and 2 is the same, the indications of the phase indicator remain unchanged, thus indicating that if the object is guided so that the phase meter remains unchanged, it follows an hyperbolic path with the relay stations 1 and 2 being the focal points.

Thus, it is seen that for every change in the difference of the distances between the navigated object and the two relay stations equal to one wave length of the carrier frequencies that the phase indicator rotates 360° and that if the wave length is less than the distances involved, it is necessary to start from a known position and integrate the changes in phase as the object is navigated. The disadvantage of this system is readily apparent for if for some reason the object moves into a different lane while the navigational equipment is out of operation, there is no indication of the new lane of position.

Figure 2 shows a means for getting navigational data with respect to two families of hyperbolas and, therefore, getting a fix on the position of the mobile transmitter which comprises the mobile transmitter 14, a reference transmitter 16 and relay stations 18, 20 and 22 located at predetermined positions. The relay stations are provided with receivers 24, 26 and 28 that are capable of receiving emissions from both transmitters 14 and 16, detecting the beat frequency between them and modulating the transmitters 30, 32 and 34, respectively, with the detected beat frequencies. Each of these relaying transmitters is operated on a unique carrier frequency and receivers 36, 38 and 40 are tuned to receive the emissions from transmitters 32, 30 and 34, respectively. The relayed beat frequencies are detected by these receivers, the output of receiver 36 is fed to each of the phase meters 42 and 44, the output of receiver 38 is fed to phase meter 42, and the output of receiver 40 is fed to phase meter 44.

Constant output amplifiers 33, 35, and 37 are supplied at the relay stations to hold the modulation level on the relay transmitter.

Starting from a known position with respect to the relay stations 18, 20 and 22, integration of the changes in phase indicated by phase meter 42 shows the change in the difference between the distances between the mobile transmitter 14 and each of the two relay stations 18 and 20, respectively, or, in other words, such integration indicates the number of hyperbolic lines 48 that have been crossed since leaving the known position. The integration of the changes in phase indicated by phase meter 44 from the same known point, likewise indicates the number of hyperbolic lines 50 that have been crossed. It is obvious that a reversal in direction with respect to either pair of relay stations causes the corresponding phase meter to reverse its direction also. The phase meters employed may be of any conventional type of integrating phase meter, such as, for example, that disclosed in Affel U. S. Patent No. 1,562,485.

In the navigational equipment described above, the receivers 36, 38 and 40 may be located on the navigated object. The indications of these phase meters 42 and 44 are not materially changed by locating them at any desired fixed location such as indicated by the rectangle 54. Therefore, the transmitter 14 that is mounted on the mobile object can be tracked from a fixed position such as 54. It is also possible to have duplicate sets of phase indicating equipment, one located on the mobile object for navigational information and the other located at some fixed position 54 for tracking data.

It is understood that the determination of the position of transmitter 14 is relative with respect to the relay stations 18, 20 and 22 and that the position of the reference transmitter 16, as long as it is fixed with respect to the relay stations, need not be known.

It is possible to get a fix on an unknown mobile transmitter 14 by heterodyning its emissions with the emissions from a reference transmitter 16. For example, the relay stations might be located on three ships or three aircraft, each of which are equipped with navigational equipment herein described so as to determine their relative positions and the position of an unknown transmitter 14 might be determined even during a brief transmission.

It is entirely possible, as shown in Figure 3, to obtain three dimensional data by the addition of a fourth relay station 45 operated on a fourth unique frequency and located so as not to be in the plane determined by the relay stations 18, 20 and 22. In such a system, it would be necessary to add an additional receiver 60 that is tuned to this fourth unique frequency and a phase meter 62. The phase of the beat frequency as relayed to receiver 60 from relay station 45 could then be compared with the phase of the beat frequency in the outputs of any of the receivers 36, 38 and 40 to determine position in space. By such a method, accurate information can be obtained as to the position of a guided missile with respect to the four relay stations and the missile need only carry a transmitter.

Figures 4 and 5 illustrate an elliptical system for navigation and tracking. The basic difference between Figures 4 and 5 is whether the phase meter is located at the mobile station or at a fixed point. Figure 4 shows a fixed transmitter 64, a mobile transmitter 66, a fixed relay station 68 having a receiving means 70 capable of detecting the beat frequencies between the mobile transmitter 66 and the stationary transmitter 64, and a transmitter 72 that is operated on a unique frequency and modulated by the output of receiver 70. Mobile receiver 71 located in the vicinity of transmitter 66 is tuned to detect the beat frequency between transmitter 66 and transmitter 64, and receiver 74 is tuned to receive the emissions from transmitter 72 and detect the beat frequency between transmitters 64 and 66 as relayed therefrom. The outputs of the receivers 71 and 74 are fed into constant output amplifiers 76 and 78, respectively, and the outputs of the latter amplifiers are, in turn, fed to phase meter 84.

In operation, as long as the sum of the distances between the mobile transmitter and the fixed receiver 70 and the fixed transmitter 64 remain constant, the indication of the phase meter does not change, thus indicating that the mobile station is moving along an ellipse which has the fixed transmitter 64 as one focal point and the fixed relay station 70 as the other.

Figure 5 shows a variation of the elliptical system that is suited for tracking purposes. It comprises a fixed transmitter 90, a mobile transmitter 92 mounted on an object being tracked, a mobile receiver 94 capable of receiving and detecting the output of both the fixed and the mobile transmitters, means for modulating transmitter 96 with the detected output of receiver 94, fixed receiver 100 capable of receiving and detecting emissions from transmitters 90 and 92, a receiver 98 capable of receiving emissions from transmitter 96, an equalizing amplifier 102 for receiver 100, an equalizing amplifier 103 for receiver 98, and a phase indicator 104. In operation, the phase of the beat frequency between transmitters 90 and 92 which, for convenience, may be operated in the same channel, are compared as they are received at receivers 94 and 98, respectively. Thus, as the sum of the distances between the fixed transmitter 90, the mobile transmitter 92, and the receiver 98 remains constant, the object being tracked comprising transmitters 92 and 96 and receiver 94 follows an elliptical path with transmitter 90 and receiver 98 being the focal points.

In both of the elliptical systems discussed above, it is apparent that if the distance between the mobile units and the fixed units is less than a full wave length of the carrier frequencies transmitted from the mobile and fixed transmitters that there is no need of a lane identification system. However, as pointed out in connection with the hyperbolic systems, extreme accuracy requires that there be a small amount of distance per degree of the phase indicator reading and that, therefore, the wave length of the carrier frequencies used in the mobile and fixed transmitters be small in comparison with the distances being determined. It is possible to determine which ellipse of the family of ellipses the mobile object is on by starting from a known position and integrating the changes in the phase indicator readings. However, as pointed out, this necessitates that the system be kept in operation continuously as one proceeds from a known point if changes in lane are to be determined.

It is readily apparent that the phase meter could be located at both the mobile and fixed positions and thereby give navigational information as well as tracking information.

In order to get a fix on any position, it is necessary to determine not only which of the family of ellipses the object is on but the position on this ellipse as well. This can be done by setting up, as shown in Figure 6, an additional relay station 110 comprising receiver 108 and transmitter 106. The corresponding component parts of Figure 4 and Figure 6 are indicated by the same numerals. Thus, transmitter 64 is now a focal point for two families of ellipses, one having another focal point in the fixed station 68 and the other having a focal point at the fixed station 110. An additional receiver 112 is required to detect the beat frequency between transmitter 66 and 64 as it is received at receiver 108 and relayed by transmitter 106 and, in addition, switching means 114 is required to compare the phase of the beat frequency as detected at receiver 70 with the phase of the beat frequency as detected at receiver 108. The carrier frequencies of transmitters 106 and 72 are different from each other and are not in the same channel as transmitters 64 and 66. It is also to be understood that the relaying of the detected beat frequencies from receivers 70 and 108 could be accomplished by cables, F. M. transmitters or any other known means. The necessity for integrating the changes in phase with respect to both families of ellipses is still present and the method of overcoming this difficulty will be discussed below.

Figure 7 illustrates a two dimensional tracking system that is similar to Figure 5 except that it has an additional relay station 116 comprising a receiver 118 capable of detecting the beat frequency between transmitters 90 and 92 and means for modulating the output of transmitter 120 with this detected beat frequency. The tracking station must be equipped with a means 122 for receiving the output of transmitter 120, and means 124 for switching the input to the constant output amplifier 102 from receiver 100 to the receiver 122. It would be possible, of course, to have an additional phase indicator but successive determinations of ellipse with respect to the families of ellipses is satisfactory for most purposes. Thus, if the object being tracked starts from known position and the changes in phase are integrated with respect to the family of ellipses formed with focal points at transmitter 90 and receiver 100 as well as the focal points 90 and relay station 116, the intersection of these two ellipses determines the position.

As shown in Figure 8, it is possible to obtain navigational information by a combination of elliptical and hyperbolic methods discussed above. Extremely accurate results can be obtained by such a system for the reason that the angles of intersection between a family of hyperbolas and a family of ellipses are nearly at right angles. The numerals, wherein possible, correspond to those of Figure 4. If an additional relay station 126 similar to that indicated by numerals 68 through 72 is established in the vicinity of transmitter 64, these two relay stations form the focal points of a hyperbolic system, which points correspond with the focal points of an elliptical system. However, it is not necessary for the operation of a system that the focal points coincide. In operation, the emissions from transmitters 64 and 66 are received by receiver 128 and means is provided for modulating transmitter 130 with the beat frequency thus detected. It is necessary that an additional receiver 132 be provided at the mobile station for receiving the output of the transmitter 130 and that switching means 134 be provided to hook the output of the receiver 132 with the input to the constant output amplifier 76 in order that the phase indicator may give an indication corresponding to the hyperbolic system. Of course, it would be entirely feasible to provide equipment at the mobile station so as to get a continuous reading of both the elliptical and hyperbolic information. Also, as pointed out above, if extreme accuracy is to be obtained by the use of wave lengths that are small in comparison with the distances involved, it will be necessary to start navigation from a known lane and separately integrate the changes in phase with respect to both the elliptical and hyperbolic systems.

In the preferred method of operation of all the systems described above, the carrier frequencies of the mobile and fixed transmitters lie within the same channel and fine results have been obtained with a 400 cycle separation of these frequencies.

As has been pointed out with respect to all the above navigational and tracking systems, it is necessary to provide means for determining the position of an object without starting at a known point. There are two methods by which position can be determined without reference to any past position and both of them depend upon the fact that if the carrier frequency of either or both of the heterodyning transmitters, 3 and 4 for example, is changed, that a change in phase of the beat frequencies is produced. It further depends upon the fact that the change in phase is of successively different magnitudes as the reference points, stations 1 and 2, of Figure 1, for example, are approached. Therefore, in Figure 1, if the frequencies of transmitters 3 and 4 are separated by some audible amount such as 400 cycles and both of them are operating in the high frequency part of the channel, it is possible to produce a change in phase meter reading by changing both of their frequencies by the same amount and transferring them to the bottom or low frequency end of the channel. As the mobile transmitter progresses from relay station 1 to relay station 2, the change in phase thus produced becomes smaller until it is zero at the midpoint and then increases in magnitude from the midpoint to receiving station 2. The change in phase between relay station 1 and the midpoint and relay station 2 and the midpoint are in opposite directions and, therefore, it is possible to determine which side of the midpoint the object is on. It is readily seen that these relationships hold true whether the object is being navigated or whether it is being tracked.

In passing from one of the solid hyperbolic lines in Figure 1 to another, the phase indicator goes through one revolution or 360 degrees and the area between each hyperbolic line is called a lane. When the frequency of the transmitters 3 and 4 are changed, a new family of hyperbolic lines, indicated by the dotted lines, is set up and the distance between the dotted line and the corresponding solid line is indicative of the amount of phase change that takes place if one were located initially on the solid lines. If the object is located at points in between the solid lines, the phase change is an intermediate amount and it is not necessary that the exact value of this amount be determined for as long as the readings are between the phase changes at two successive solid lines, the lane is determined. Of course, much as in the system of Loran, charts have to be provided so that the phase indications may have direct significance and do not have to be calculated each time.

Another method of obtaining lane identification is to interchange the frequency of transmitter 3 with that of transmitter 4. Whereas the beat frequency remains the same, a phase change in the beat frequencies is produced because the distances of transmission for the two frequencies have been changed.

An alternative method of achieving the same results and maintaining the same beat frequency is by changing one of the transmitters to a frequency on the other side of the other transmitter, the difference in the frequencies being kept the same. This has an effect on the change in phase similar to that produced when both of the transmitters are changed in frequency and the difference between them is maintained constant.

These methods of lane identification have been discussed with respect to Figure 1 which is a single hyperbolic system. They may be applied to a double hyperbolic system such as is indicated in Figure 2 with equal success as the changes in phase indicated by phase meters 42 and 44, respectively, determine the lane with respect to the stations 18 and 20 and 20 and 22. If the mobile transmitter is being tracked, it is obvious that the easiest way to obtain information concerning lane identification is to change the frequency of transmitter 32 onto the other side of the frequency of the mobile transmitter. This method can be of use in determining the position of an unknown transmitter with respect to three known locations by heterodyning it first with a frequency below its carrier frequency and then heterodyning it with a frequency above its carrier frequency.

It is thought that application of the above methods to a three dimensional system is unnecessary as the methods used are identical.

Similar results are produced in the elliptical systems discussed in connection with Figures 4 through 7 by altering the frequencies of the heterodyning transmitters as described above. In Figure 4, for example, as the transmitter frequencies are changed in accordance with any of the above methods, the phase meter indications change by amount shown by the dotted system of ellipses, and it is seen that this phase change gets progressively greater as the object gets further away from the focal points at the fixed stations. It is only necessary to determine the change in reading as being between the change that would be produced at two successive solid lines as the normal operation determines the exact position within the lane.

If the changes in the phase indications could be made great enough, it would be possible to determine position with accuracy because, as pointed out above, the change in the phase difference as the transmitters are operated first at one frequency and then at another is gradual and has a direct relation to the distances involved. However, as the amount of frequency change that can be produced in the standard allotted channels is slight, it is posssible to use this method only for purposes of lane identification.

It is not felt that it is necessary to apply the above systems to the elliptical systems indicated by Figures 5, 6 and 7 or to Figure 8 which illustrates the combination of hyperbolic and eliptical systems and that one skilled in the art could, on the basis of the above discussion, determine the lane of position in these systems by use of the methods described.

It is believed that the above navigation and tracking systems are unique and that they are a marked advance over any prior art in that they teach a method of using standard transmitters and receivers so as to determine position with extreme accuracy regardless of the distance involved.

I claim:

1. A navigation system comprising a mobile transmitter and a fixed transmitter, said transmitters being tuned to operate at different frequencies, a plurality of spaced means for receiving the transmissions of said transmitters and detecting the beat frequency therebetween, and means for relaying the beat frequencies so detected to a common point.

2. A navigation system according to claim 1, wherein said common point is a fixed point.

3. A navigation system according to claim 1, wherein said common point is at said fixed transmitter.

4. A navigation system according to claim 1, wherein said common point is at said mobile transmitter.

5. A navigation system comprising a mobile transmitter and a fixed transmitter, said transmitters being tuned to operate at different frequencies, a plurality of spaced means for receiving the transmissions of said transmitters and detecting the beat frequency therebetween, means for relaying the beat frequencies so detected to a common point, and means at said common point for indicating the difference in phase between said detected beat frequency signals.

6. A navigation system according to claim 5, wherein said common point is a fixed point.

7. A navigation system according to claim 5, wherein said common point is at said mobile transmitter.

8. A navigation system according to claim 5, wherein said plurality of spaced receiving means are fixed.

9. A navigation system comprising a mobile transmitter and a fixed transmitter, said transmitters being tuned to operate at different frequencies, a plurality of spaced means for receiving the transmissions of said transmitters and detecting the beat frequency therebetween, means for relaying the beat frequencies so detected to a plurality of common points, and means at each of said common points for indicating the difference in phase between said detected beat frequency signals.

10. A navigation system according to claim 9, wherein one of said common points is fixed and another of said common points is at said mobile transmitter.

11. A two-dimensional navigation system comprising a mobile transmitter and a fixed transmitter, said transmitters being tuned to operate at different frequencies, three spaced means for receiving the transmissions of said transmitters and detecting the beat frequency therebetween, means associated with each of said spaced receiving means for relaying the beat frequencies so detected to a common point, and means at said common point for indicating the difference in phase between two pairs of said detected beat frequency signals.

12. A three-dimensional navigation system comprising a mobile transmitter and a fixed transmitter, said transmitters being tuned to operate at different frequencies, four spaced means for receiving the transmissions of said transmitters and detecting the beat frequency therebetween, means associated with each of said spaced receiving means for relaying the beat frequencies so detected to a common point, and means at said common point for indicating the difference in phase between three pairs of said beat frequency signals.

13. A navigation system comprising a mobile transmitter and a fixed transmitter, said transmitters being tuned to operate at slightly different frequencies, a plurality of spaced means for receiving the transmissions of said transmitters and detecting the beat frequency therebetween, means for transmitting the beat frequencies so detected at unique frequencies, means at a common point for receiving the detected beat frequency signals transmitted at said unique frequencies, and means at said common point for indicating the difference in phase between said detected beat frequency signals.

14. A navigation system comprising a mobile transmitter and a fixed transmitter, said transmitters being tuned to operate at different frequencies, a plurality of spaced means for receiving the transmissions of said transmitters and detecting the beat frequency therebetween, means for relaying the beat frequencies so detected to a common point, and means at said common point for indicating and integrating the difference in phase between said detected beat frequency signals.

15. A navigation system comprising a mobile transmitter and a fixed transmitter, said transmitters being tuned to operate at different frequencies, a plurality of spaced means for receiving the transmissions of said transmitters and detecting the beat frequency therebetween, means for transmitting the beat frequencies so detected at unique frequencies, means at a common point for receiving the detected beat frequency signals transmitted at said unique frequencies, means for equalizing the output of said receivers at said common point, and means for separately indicating the difference in phase between the output of one of said receivers with the output of each of two others of said receivers.

16. An elliptical navigation system comprising a mobile transmitter and a fixed transmitter, said transmitters being tuned to operate at different frequencies, a plurality of spaced means for receiving the transmissions of said transmitters and detecting the beat frequency therebetween, one of said spaced receiving means being positioned at said moble transmitter and the other being fixed, means for relaying the beat frequencies so detected to a common point, and means at said common point for indicating the difference in phase between said detected beat frequency signals.

17. An elliptical navigation system according to claim 16, wherein said common point is also at said mobile transmitter.

18. An elliptical navigation system according to claim 16, wherein said common point is at the fixed receiving means.

19. A two-dimensional elliptical navigation system comprising a mobile transmitter and a fixed transmitter, said transmitters being tuned to operate at different frequencies, three spaced means for receiving the transmissions of said transmitters and detecting the beat frequency therebetween, one of said spaced receiving means being positioned at said mobile transmitter and the others being fixed, means associated with each of said spaced receiving means for relaying the beat frequencies so detected to a common point, and means at said common point for indicating the difference in phase between two pairs of said detected beat frequency signals.

20. A two-dimensional elliptical navigation system according to claim 19, wherein said common point is also at said mobile transmitter.

21. A two-dimensional elliptical navigation system according to claim 19, wherein said common point is at one of said fixed receiving means.

22. A two-dimensional combined elliptical and hyperbolic navigation system comprising a mobile transmitter and a fixed transmitter, said transmitters being tuned to operate at different frequencies, three spaced means for receiving the transmissions of said transmitters and detecting the beat frequency therebetween, one of said spaced receiving means being positioned at said mobile transmitter, another of said spaced receiving means being fixed in the vicinity of said fixed transmitter and the third of said spaced receiving means being fixed, means associated with each of said spaced receiving means for relaying the beat frequencies so detected to a common point and means at said common point for indicating the difference in phase between two pairs of said detected beat frequency signals.

23. A navigation system according to claim 5, including means for changing the operating frequency of one of said transmitters and means for indicating the resultant change in phase difference effected thereby at said common point.

24. A navigation system according to claim 5, including means for changing the operating frequency of both of said transmitters and means for indicating the resultant change in phase difference effected thereby at said common point.

25. A navigational method of lane identification comprising the steps of transmitting from two spaced transmitters at different frequencies, detecting the beat frequency between said transmissions at two spaced points, relaying the beat frequencies so detected to a common point, measuring the difference in phase between said beat frequencies at said common point, changing the operating frequency of one of said transmitters, and measuring the resultant change in phase difference effected thereby at said common point.

26. A navigational method of lane identification comprising the steps of transmitting from two spaced transmitters at different frequencies, detecting the beat frequency between said transmissions at two spaced points, relaying the beat frequencies so detected to a common point, measuring the difference in phase between said beat frequencies at said common point, changing the operating frequency of one of said transmitters, and measuring the magnitude and direction of the resultant change in phase difference effected at said common point.

27. A navigational method of lane identification comprising the steps of transmitting from two spaced transmitters, the operating frequencies of said transmitters differing by an audio note, detecting the beat frequency between said transmissions at two spaced points, relaying the beat frequencies so detected to a common point, measuring the difference in phase between said beat frequencies at said common point, changing the operating frequency of one of said transmitters to a frequency also differing from that of the other of said transmitters by an audio note, and measuring the resultant change in phase difference effected thereby at said common point.

28. A navigational method of lane identification comprising the steps of transmitting from two spaced transmitters, the operating frequencies of said transmitters differing by an audio note, detecting the beat frequency between said transmissions at two spaced points, relaying the beat frequencies so detected to a common point, measuring the difference in phase between said beat frequencies at said common point, interchanging the operating frequency of said transmitters, and measuring the magnitude and direction of the resultant change in phase difference effected at said common point.

CHARLES E. HASTINGS.

REFERENCES CITED

The following references are of record in the file of this patent:

UNITED STATES PATENTS

| Number | Name | Date |
|---|---|---|
| Re. 23,050 | Brunner | Nov. 23, 1948 |
| 1,562,485 | Affel | Nov. 24, 1925 |
| 2,405,238 | Seeley | Aug. 6, 1946 |
| 2,408,773 | Goodall | Oct. 8, 1946 |
| 2,440,755 | O'Brien | May 4, 1948 |
| 2,483,558 | O'Brien | Oct. 4, 1949 |